(12) United States Patent
Gao et al.

(10) Patent No.: US 9,252,932 B2
(45) Date of Patent: Feb. 2, 2016

(54) METHOD, DEVICE, AND SYSTEM FOR REPORTING CHANNEL QUALITY INDICATOR

(75) Inventors: Qiubin Gao, Beijing (CN); Wenhong Chen, Beijing (CN); Hao Ni, Beijing (CN); Chun Luo, Beijing (CN); Hui Li, Beijing (CN); Shaohui Sun, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 175 days.

(21) Appl. No.: 14/113,216

(22) PCT Filed: Mar. 31, 2012

(86) PCT No.: PCT/CN2012/073438
§ 371 (c)(1),
(2), (4) Date: Oct. 22, 2013

(87) PCT Pub. No.: WO2012/142913
PCT Pub. Date: Oct. 26, 2012

(65) Prior Publication Data
US 2014/0056272 A1    Feb. 27, 2014

(30) Foreign Application Priority Data
Apr. 22, 2011  (CN) .......................... 2011 1 0102148

(51) Int. Cl.
*H04L 5/00*     (2006.01)
*H04J 11/00*    (2006.01)
(Continued)

(52) U.S. Cl.
CPC ........... *H04L 5/0035* (2013.01); *H04J 11/0053* (2013.01); *H04L 1/0019* (2013.01);
(Continued)

(58) Field of Classification Search
None
See application file for complete search history.

(56) References Cited

U.S. PATENT DOCUMENTS

2010/0113028 A1*  5/2010  Simonsson et al. ........... 455/437
2010/0157924 A1*  6/2010  Prasad et al. .................. 370/329
(Continued)

FOREIGN PATENT DOCUMENTS

CN    101686077 A    3/2010
CN    101753186 A    6/2010
(Continued)

OTHER PUBLICATIONS

International Search Report for PCT/CN2012/073438.
(Continued)

*Primary Examiner* — Gary Mui
(74) *Attorney, Agent, or Firm* — Kilpatrick Townsend & Stockton LLP

(57) ABSTRACT

Disclosed are a method, device, and system for reporting a channel quality indicator (CQI), applicable in solving the problem in coordinated multipoint transmission technology of the incapability of a network side to execute accurately resource distribution and scheduling due to the incapability of the network side to have accurate knowledge of the interference that a terminal is being subjected to. The method is: on the basis of measurement reference signals transmitted by each device in a measurement collection, the terminal feeding back to a network side device an initial CQI of each device in the measurement collection; on the basis of the initial CQI of each device fed back by the terminal, and of channel matrix reference information fed back by the terminal, the network side device calculating a target CQI of the terminal. This allows the network side to learn accurately the interference that the terminal is being subjected to, thus allowing for accurate execution of terminal scheduling, resource distribution, and MCS selection, for effectively improved system throughput in coordinated multipoint transmission, and for improved system performance.

20 Claims, 7 Drawing Sheets

(51) Int. Cl.
  *H04W 24/02* (2009.01)
  *H04L 1/20* (2006.01)
  *H04L 1/00* (2006.01)
  *H04W 72/12* (2009.01)
  *H04W 72/00* (2009.01)

(52) U.S. Cl.
  CPC ............ *H04L1/0026* (2013.01); *H04L 1/0035* (2013.01); *H04L 1/0077* (2013.01); *H04L 1/20* (2013.01); *H04L 5/0073* (2013.01); *H04W 24/02* (2013.01); *H04L 1/0003* (2013.01); *H04L 1/0009* (2013.01); *H04L 2001/0092* (2013.01); *H04W 72/00* (2013.01); *H04W 72/12* (2013.01)

(56) References Cited

U.S. PATENT DOCUMENTS

2010/0322176 A1* 12/2010 Chen et al. .................... 370/329
2012/0140694 A1* 6/2012 Sun et al. ...................... 370/312

FOREIGN PATENT DOCUMENTS

| CN | 101841847 A | 9/2010 |
| CN | 101854233 A | 10/2010 |
| CN | 101854658 A | 10/2010 |
| CN | 101997587 A | 3/2011 |
| CN | 102149130 A | 8/2011 |
| JP | 2011-82709 A | 4/2011 |
| WO | 2011/017968 A1 | 2/2011 |

OTHER PUBLICATIONS

3GPP TSG RAN WG1 Meeting #64, Taipei, Taiwan, Feb. 21-25, 2011, 7 pages.
3GPP TSG RAN WG1 Meeting #58bls, Miyazaki, Japan, Oct. 12-16, 2009, 6 pages.
TSG-RAN WG4 Meeting #64, Taipei, Taiwan, Feb. 21-25, 2011, 5 pages.
3GPP TSG RAN WG1 Meeting #64 R1-110866, Taipei, Taiwan, Feb. 21-25, 2011, 6 pages.
European Search Report for European counterpart application 12774811.9.

* cited by examiner

METHOD, DEVICE, AND SYSTEM FOR REPORTING CHANNEL QUALITY INDICATOR

The present application is a U.S. National Stage of International Application No. PCT/CN2012/073,438, filed Mar. 31, 2012, designating the U.S., and claiming priority to Chinese Patent Application No. 201110102148.2, filed with the State Intellectual Property Office of PRC on Apr. 22, 2011 and entitled "Method, apparatus and system for reporting channel quality indicator", the content of which is incorporated herein by reference in its entirety.

FIELD

The present invention relates to the field of communications and particularly to a method, apparatus and system for reporting a channel quality indicator.

BACKGROUND

In a wireless cellular network system, there is typically a base station in communication with a User Equipment (UE) in each cell. Various user equipments include a mobile phone, a notebook, a Personal Digital Assistant (PDA), etc. Prior to commence of a data transmission process, the base station may transmit a reference signal (e.g., a pilot signal) to the user equipment, and the user equipment may derive a channel estimation value from the reference signal. The reference signal is a known signal sequence transmitted at a specific time and a specific frequency as prescribed, and the quality of channel estimation may be influenced by interference, noise and other factors.

Typically user equipments are located at different geographic positions and are subjected to different received signal strength and different noise and interference strength. Thus some user equipments may communicate at a higher rate, for example, a user equipment located at the center of the cell, and some other user equipments can only communicate at a lower rate, for example, a user equipment located at the edge of the cell. In order to make full use of a transmission bandwidth of a user equipment, data is transmitted to the user equipment preferably in a format matching a channel condition of the user equipment, and a technology to match the format, in which data is transmitted to the user equipment, with a channel condition of the user equipment is referred to link adaptation.

In order to assist the base station in link adaptation, the user equipment needs to report a Channel Quality Indicator (CQI) according to a channel condition of the user equipment. The CQI reported by the user equipment corresponds to a specific time-frequency resource, that is, the CQI reported by the user equipment represents a transmission capacity on the time-frequency resource. In order to calculate the CQI, the user equipment needs to measure interference I and noise power $N_0$ to which it is subjected. For example, a straightforward CQI calculation formula is:

$$CQI = Q\left(\frac{P}{I+N_0}\right),$$

Where P is received signal power of the user equipment, and $Q(\bullet)$ is a quantization function; and in practice, the user equipment may measure the sum of I and $N_0$, i.e., $I+N_0$.

In the prior art, the technology of Coordinated Multipoint Transmission/Reception (CoMP) refers to coordinated scheduling or joint transmission of multiple geographically separated transmission points for the purpose of lowering mutual interference and improving the quality of a signal received by a user to thereby effectively improve the capacity of a system and the spectral efficiency of an edge user. The multiple separated transmission points typically refer to base station devices of multiple cells or possibly different base station devices in the same cell.

Coordinated scheduling refers to that the respective base stations coordinate time, frequency and space resources between the cells to allocate mutually orthogonal resources for different UEs to thereby avoid mutual interference. Inter-cell interference is a predominant factor restricting the performance of a cell edge UE, and inter-cell interference can be lowered through coordinated scheduling to thereby improve the performance of the cell edge UE. Referring to FIG. 1, for example, coordinated scheduling of three cells can schedule three UEs possibly interfering with each other onto mutually orthogonal resources to thereby effectively avoid interference between the cells.

Joint transmission refers to concurrent transmission of data from multiple cells to a UE to thereby enhance a received signal of the UE. Referring to FIG. 2, for example, data is transmitted from three cells to the same UE on the same resource, and the UE receives signals from the multiple cells concurrently. On one hand, superposition of the useful signals from the multiple cells can improve the quality of the signals received by the UE. On the other hand, interference to which the UE is subjected can be lowered to thereby improve the performance of a system.

In Long Term Evolution (LTE) and LTE-Advanced (LTE-A) systems, a UE estimates channel information of a base station to the UE (e.g., a signal matrix, interference, noise, etc.) according to a Cell-specific Reference Signal (CRS) or a Channel State Information-Reference Signal (CSI-RS) of a serving cell, calculates a CQI, and feeds the CQI back to the base station, possibly together with a Pre-coding Matrix Index (PMI) and an Rank Indicator (RI). The base station can perform scheduling, resource allocation, Modulation and Coding Scheme (MCS) selection and other operations using the feedback of the CQI to thereby improve the spectral efficiency. In order to support multipoint coordinated transmission, a report of channel information needs to be further enhanced. The UE estimates channel information of cells included in a preconfigured measurement set to the UE according to CRSs or CSI-RSs transmitted from the respective cells, and next the UE directly scalar-quantizes or vector-quantizes the channel information and then feeds it back to the base stations, and the base stations perform pre-coding matrix calculation, multi-user pairing, MCS selection and other operations according to the channel information fed back from the UE.

In the CoMP technology of a Time Division Duplex (TDD) system, a base station can derive uplink channel information from a Sounding Reference Signal (SRS) transmitted from a UE and derive downlink channel information by the reciprocity of uplink and downlink channels. In the existing TDD system, the base station can not accurately select an MCS and perform frequency-domain scheduling for the UE simply according to the channel information derived from the SRS because the uplink and the downlink are subjected to typically different interference and the base station can not accurately predicate interference to which the UE is subjected; and on the other hand, in the existing TDD system, the base station can not accurately select an MCS and perform frequency-domain scheduling for the UE even according to the channel information fed back from the UE because an interference level of an adjacent cell before scheduling is different from that after scheduling due to the use of the CoMP technology as well as beam shaping and other schemes so that the UE can not predicate a changed interference level after scheduling upon feeding back the channel information.

In view of this, it is desirable to redesign a corresponding CoMP-based channel information calculation and report solution.

SUMMARY

Embodiments of the invention provide a method, apparatus and system for reporting a channel quality indicator so as to address the problem in the technology of multipoint coordinated transmission that the network side has no accurate knowledge of interference to which a user equipment is subjected and consequently fails to correctly perform resource allocation and scheduling.

Particular technical solutions according to the embodiments of the invention are as follows:

A method of reporting a CQI includes:

a user equipment determining a measurement set used by the user equipment, the measurement set including a first device transmitting service data to the user equipment and at least one second device participating in multipoint coordinated transmission to the user equipment;

the user equipment receiving a measurement reference signal transmitted from each device in the measurement set respectively and measuring an initial CQI of each device respectively based upon the measurement reference signal transmitted from the corresponding device; and the user equipment transmitting the derived initial CQIs of the respective devices to a network-side apparatus and transmitting channel matrix reference information to the network-side apparatus so that the network-side apparatus calculates a target CQI of the user equipment based upon the received initial CQIs of the respective devices and channel matrix reference information.

A method of processing a CQI includes:

a network-side apparatus receiving initial CQIs, of respective devices in a measurement set, transmitted from a user equipment, the measurement set including a first device transmitting service data to the user equipment and at least one second device participating in multipoint coordinated transmission to the user equipment; and the network-side apparatus receiving channel matrix reference information originating from the user equipment and calculating a target CQI of the user equipment based upon the received initial CQIs of the respective devices and channel matrix reference information.

An apparatus for reporting a CQI includes:

a determining unit configured to determine a measurement set used by the apparatus, the measurement set including a first device transmitting service data to the apparatus and at least one second device participating in multipoint coordinated transmission to the apparatus;

a receiving unit configured to receive a measurement reference signal transmitted from each device in the measurement set respectively;

a measuring unit configured to measure an initial CQI of each device respectively based upon the measurement reference signal transmitted from the corresponding device; and a transmitting unit configured to transmit the derived initial CQIs of the respective devices to a network-side apparatus and to transmit channel matrix reference information to the network-side apparatus so that the network-side apparatus calculates a target CQI of the apparatus based upon the received initial CQIs of the respective devices and channel matrix reference information.

An apparatus for processing a CQI includes:

a communicating unit configured to receive initial CQIs, of respective devices in a measurement set, transmitted from a user equipment and to receive channel matrix reference information originating from the user equipment, the measurement set including a first device transmitting service data to the user equipment and at least one second device participating in multipoint coordinated transmission to the user equipment; and a processing unit configured to calculate a target CQI of the user equipment based upon the received initial CQIs of the respective devices and channel matrix reference information.

A system for reporting and processing a CQI includes:

a user equipment configured to determine a measurement set used by the user equipment, the measurement set including a first device transmitting service data to the user equipment and at least one second device participating in multipoint coordinated transmission to the user equipment; and to receive a measurement reference signal transmitted from each device in the measurement set respectively, to measure an initial CQI of each device respectively based upon the measurement reference signal transmitted from the corresponding device, to transmit the derived initial CQIs of the respective devices to a network-side apparatus, and to transmit channel matrix reference information to the network-side apparatus so that the network-side apparatus calculates a target CQI of the user equipment based upon the received initial CQIs of the respective devices and channel matrix reference information; and the network-side apparatus configured to receive the initial CQIs, of the respective devices in the measurement set, transmitted from the user equipment, to receive the channel matrix reference information originating from the user equipment and to calculate the target CQI of the user equipment based upon the received initial CQIs of the respective devices and channel matrix reference information.

In the embodiments of the invention, the user equipment feeds the initial CQIs of the respective devices in the measurement set back to a base station in the network-side apparatus according to the measurement reference signals transmitted from the respective devices in the measurement set, and the network-side apparatus calculates the target CQI of the user equipment according to the initial CQIs of the respective devices fed back from the user equipment and the channel matrix reference information fed back from the user equipment, thereby addressing the problem of feeding back a CQI for multipoint coordinated transmission so that the network-side apparatus can derive the target CQI finally used for downlink transmission of data based upon the initial CQIs of the multiple devices fed back from the user equipment, and thus the network side can have accurate knowledge of interference to which the user equipment is subjected and further correctly perform user equipment scheduling, resource allocation and MCS selection to thereby effectively improve the throughout of the system in multipoint coordinated transmission and improve the performance of the system. The present embodiments will be equally applicable to both a TDD system and an FDD system.

DETAILED DESCRIPTION OF THE EMBODIMENTS

In the technology of multipoint coordinated transmission, in order to enable the network side to have accurate knowledge of interference to which a user equipment is subjected to thereby correctly perform resource allocation and scheduling, in an embodiment of the invention, the user equipment needs to measure initial CQIs for respective devices in a measurement set, to report the initial CQIs of the respective devices to a network-side apparatus and to transmit channel matrix reference information to the network-side apparatus so that the network-side apparatus calculates a target CQI of the user equipment based upon the received initial CQIs of the respective devices and channel matrix reference information.

The measurement set includes a first device transmitting service data to the user equipment and at least one second device participating in multipoint coordinated transmission to the user equipment; and the first device and the second device can be base stations of different cells or can be base stations of the same cell.

In this embodiment, the network-side apparatus can be the first device in the measurement set or can be any one or more devices in the measurement set (which can be the first device or the second device) or can be a central control node connected with all the devices in the measurement set.

Preferred implementations of the invention will be detailed below with reference to the drawings.

Figure 1:
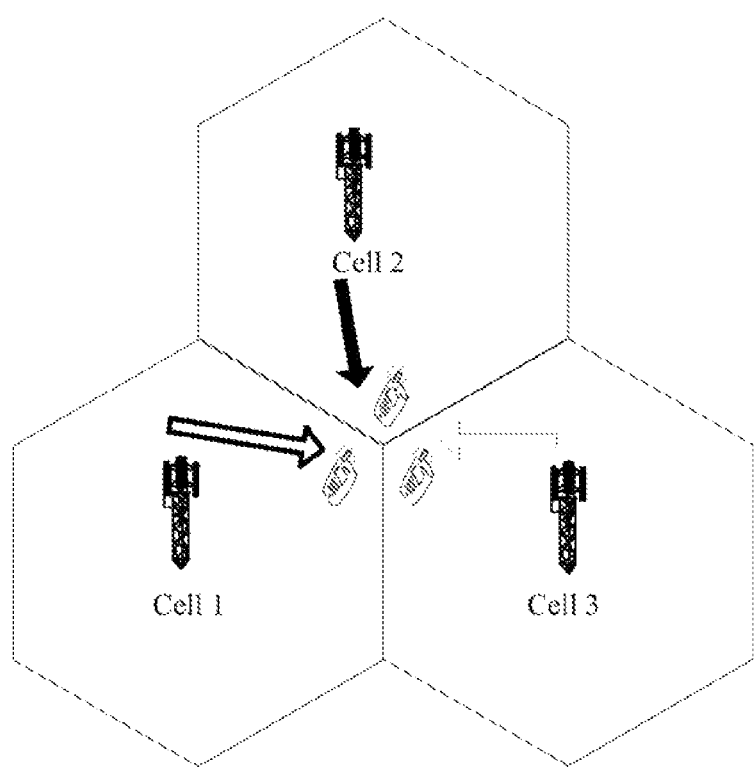
FIG. 1 and FIG. 2 are schematic diagrams of multipoint coordinated transmission in the prior art.
Figure 2:
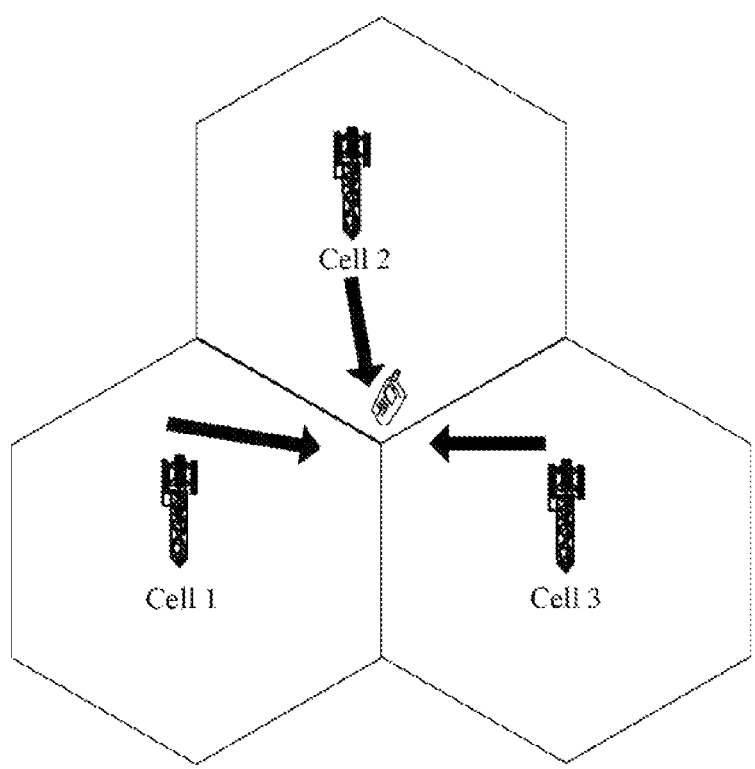
Figure 3:
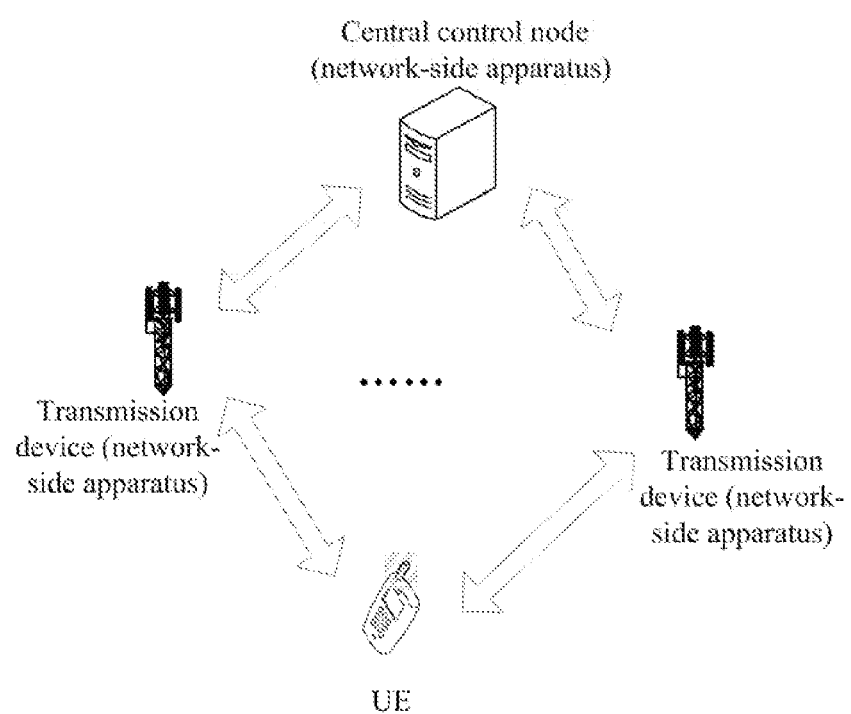
FIG. 3 is an architectural diagram of a communication system in an embodiment of the invention.

Referring to FIG. 3, in an embodiment of the invention, a CoMP-enabled communication system (which can be a TDD system or an FDD system) includes a user equipment and several transmission devices, and there is a multipoint coordinated transmission relationship (which can be either a coordinated scheduling relationship or a joint transmission relationship) between these transmission devices, where one of the transmission devices, i.e., the first device, transmits service data to the user equipment, and the other transmission devices, i.e., the second devices, also participate in multipoint coordinated transmission to the user equipment; and a measurement set for the user equipment is composed of the first device and the at least one second devices, and during network registration of the user equipment, the measurement set is notified in advance from the network side to the user equipment and stored in the user equipment, and the user equipment needs to measure channel information for each device in the measurement set so that the network side accurately estimates interference to which the user equipment is subjected.

The user equipment is configured to determine a measurement set used by the user equipment, the measurement set including the first device transmitting service data to the user equipment and the at least one second device participating in multipoint coordinated transmission to the user equipment, to receive a measurement reference signal transmitted from each device in the measurement set respectively, to measure an initial CQI of each device respectively based upon the measurement reference signal transmitted from the corresponding device, to transmit the derived initial CQIs of the respective devices to a network-side apparatus, and to transmit also channel matrix reference information to the network-side apparatus so that the network-side apparatus calculates a target CQI of the user equipment based upon the received initial CQIs of the respective devices and channel matrix reference information; and The network-side apparatus is configured to receive the initial CQIs, of the respective devices in the measurement set, transmitted from the user equipment, to receive the channel matrix reference information originating from the user equipment, and to calculate the target CQI of the user equipment based upon the received initial CQIs of the respective devices and channel matrix reference information.

Figure 4:
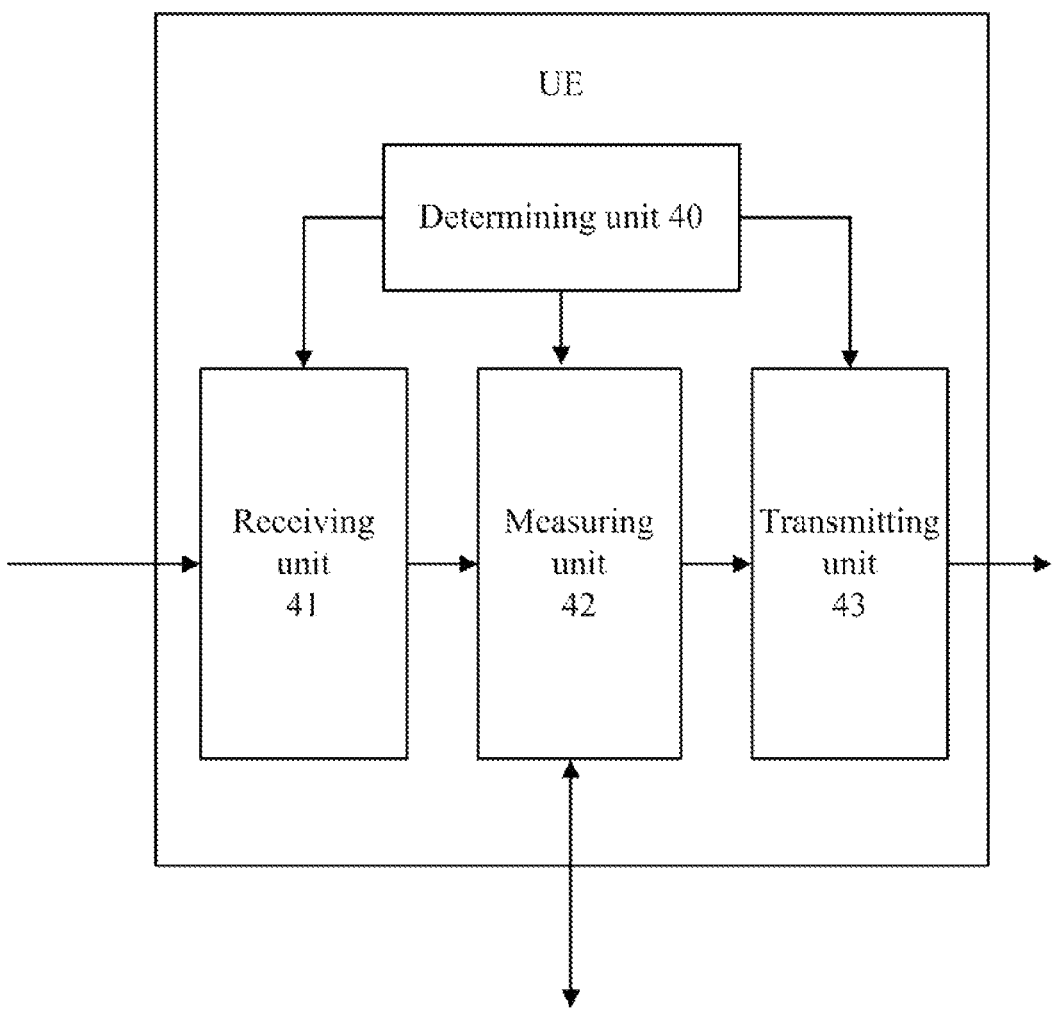
FIG. 4 is a schematic functional structural diagram of a user equipment in an embodiment of the invention.

Referring to FIG. 4, in an embodiment of the invention, a user equipment includes a determining unit 40, a receiving unit 41, a measuring unit 42 and a transmitting unit 43, where:

The determining unit 40 is configured to determine a measurement set used by the user equipment, where the measurement set includes a first device transmitting service data to the user equipment and at least one second device participating in multipoint coordinated transmission to the user equipment;

the receiving unit 41 is configured to receive a measurement reference signal transmitted from each device in the measurement set respectively;

The measuring unit 42 is configured to measure an initial CQI of each device respectively based upon the measurement reference signal transmitted from the corresponding device; and The transmitting unit 43 is configured to transmit the derived initial CQIs of the respective devices to the network-side apparatus and to transmit channel matrix reference information to the network-side apparatus so that the network-side apparatus calculates a target CQI of the user equipment based upon the received initial CQIs of the respective devices and channel matrix reference information.

Figure 5:
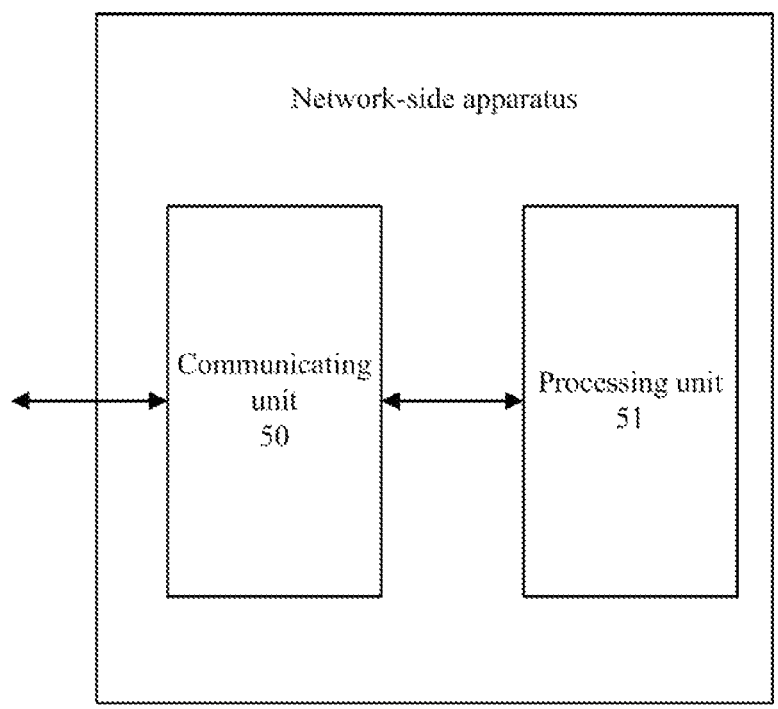
FIG. 5 is a schematic functional structural diagram of a network-side apparatus in an embodiment of the invention.

Referring to FIG. 5, in an embodiment of the invention, the network-side apparatus includes a communicating unit 50 and a processing unit 51, where:

The communicating unit 50 is configured to receive initial CQIs, of respective devices in a measurement set, transmitted from a user equipment, where the measurement set includes a first device transmitting service data to the user equipment and at least one second device participating in multipoint coordinated transmission to the user equipment, and to receive channel matrix reference information originating from the user equipment; and The processing unit 51 is configured to calculate a target CQI of the user equipment based upon the received initial CQIs of the respective devices and channel matrix reference information.

Figure 6:
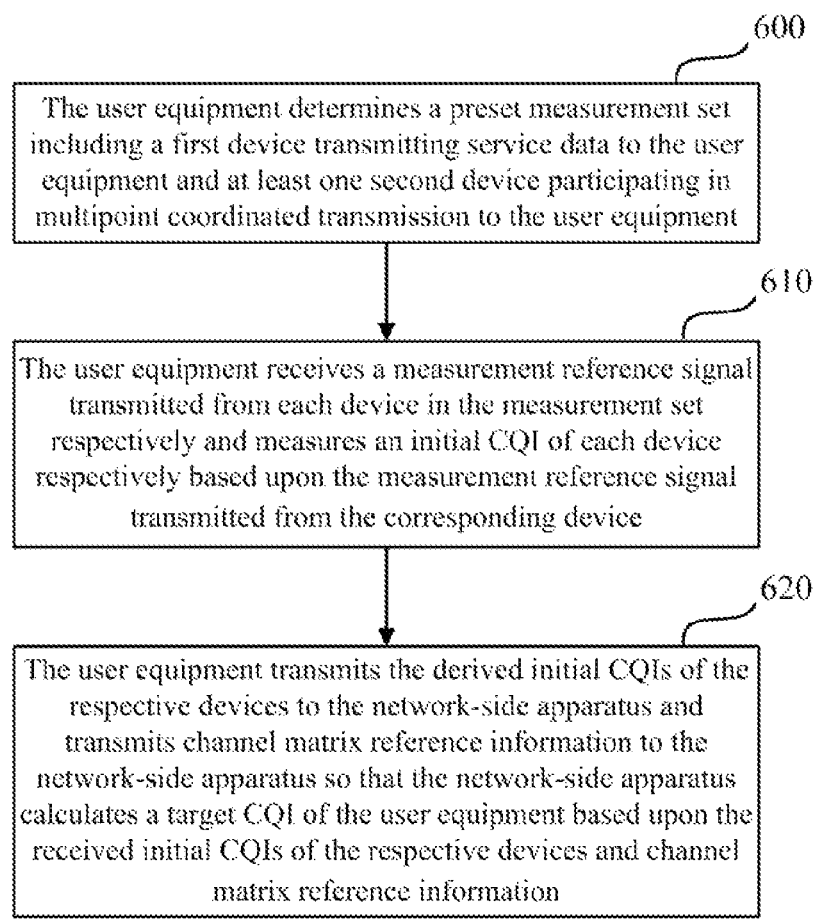
FIG. 6 is a flow chart of a user equipment reporting a CQI to a network-side apparatus in an embodiment of the invention.

Based upon the foregoing technical solution, referring to FIG. 6, in an embodiment of the invention, a user equipment reports a CQI to the network side in the following detailed flow:

Step 600: The user equipment determines a measurement set used by the user equipment, the measurement set including a first device transmitting service data to the user equipment and at least one second device participating in multipoint coordinated transmission to the user equipment.

The measurement set used by the user equipment can be transmitted to the user equipment after being configured by a base station, and the user equipment determines the measurement set according to an indicator of the base station, for example, the base station notifies a particular measurement set in downlink signaling; or the measurement set can be configured by the user equipment itself in a pattern prescribed with the network side.

Step 610: The user equipment receives a measurement reference signal transmitted from each device in the measurement set respectively and measures an initial CQI of each device respectively based upon the measurement reference signal transmitted from the corresponding device.

In this embodiment, the measurement reference signal, transmitted from each device, received by the user equipment includes a CRS and/or a CSI-RS transmitted from the corresponding device.

The user equipment measures the initial CQI of any device based upon the measurement reference signal transmitted from the device by firstly deriving a channel matrix of the device to the user equipment on respective sub-carriers based upon the measurement reference signal transmitted from the device and then calculating the initial CQI of the device in Formula 1:

$$\bar{\gamma}_{qi} = Q(f(\{\gamma_{qi}(k)\}_{k \in S}))$$ Formula 1

Where $\bar{\gamma}_{qi}$ is the initial CQI of the i-th device in the measurement set of the user equipment q;

Q(•) is a quantization function;

S is a set of sub-carriers, where S includes sub-carriers in a section of time-frequency resource block, which can be a Physical Resource Block (PRB), a sub-band (including several consecutive PRBs) or the entire bandwidth of a system;

$f(•)$ is a mapping function to map $\{\gamma_{qi}(k)\}_{k \in S}$ to a value representing an average channel quality on all the sub-carriers in S, where $f(•)$ can be linear averaging, $$f(\{\gamma_{qi}(k)\}_{k \in S}) = \frac{1}{|S|} \sum_{k \in S} (\gamma_{qi}(k)),$$

an Exponential Effective SIR Mapping (EESM) or another mapping function; and $\gamma_{qi}(k)$ is the initial CQI of the i-th device in the measurement set of the user equipment q on a sub-carrier k, where $$\gamma_{qi}(k) = \frac{\|H_{qi}(k)\|^2}{N(k)},$$

$H_{qi}(k)$ is the channel matrix, with the dimensionality of $N_{R,q} \times N_{T,i}$, of the i-th device to the user equipment q on the sub-carrier k, $N_{R,q}$ is the number of receiving antennas of the user equipment q, $N_{T,i}$ is the number of transmitting antennas of a base station in the i-th device, and N(k) represents interference and noise power to which the user equipment is subjected, where the interference preferably includes only interference beyond the measurement set; or $\gamma_{q,i}(k)$ can be calculated otherwise, for example, the user equipment calculates a linear detector on the sub-carrier k as $g_q(k)$ according to channel information, and then $$\gamma_{qi}(k) = \frac{\|g_q(k)H_{qi}(k)\|^2}{N(k)}.$$

Step 620: The user equipment transmits the derived initial CQIs of the respective devices to the network-side apparatus and transmits channel matrix reference information to the network-side apparatus so that the network-side apparatus calculates a target CQI of the user equipment (that is, a CQI from which the network side finally performs resource scheduling and MCS selection for the user equipment) based upon the received initial CQIs of the respective devices and channel matrix reference information.

The target CQI of the user equipment can be calculated in the first device or can be calculated in any one or more devices in the measurement set or can be calculated in a central control node connected with all the devices in the measurement set, that is, the network-side apparatus can be the first device, or any one or more devices in the measurement set, or the central control node.

In this embodiment, the user equipment transmitting the derived initial CQIs of the respective devices to the network-side apparatus refers to that the user equipment transmitting the derived initial CQIs of the respective devices to the first device on an uplink channel or to the any one or more devices in the measurement set (which can include either the first device or the second device) or to the central control node connected with all the devices in the measurement set.

In the process of the step 620, the user equipment can transmit the channel matrix reference information to the network-side apparatus in (including but not limited to) the following two approaches:

In a first approach, the user equipment transmits an SRS after transmitting the derived initial CQIs of the respective devices to the network-side apparatus so that each device in the measurement set derives an uplink channel matrix of the user equipment to the corresponding device based upon the received SRS and derives a corresponding downlink channel matrix based upon channel reciprocity and then transmits its own derived downlink channel matrix to the network-side apparatus as the channel matrix reference information.

In a second approach, the user equipment transmits channel matrices, derived respectively based upon a downlink reference symbol of each device in the measurement set, to the network-side apparatus as the channel matrix reference information after transmitting the derived initial CQIs of the respective devices to the network-side apparatus. At this time the user equipment needs not to transmit an SRS.

For example, after an SRS transmitted from the user equipment is received by a base station in a specific device in the measurement set, the base station calculates an uplink channel matrix of the user equipment to the device served by the base station according to the received SRS and derives a downlink channel matrix $\hat{H}_{q,i}(k)$ based upon channel reciprocity, and since the user equipment is different in transmission power from the base station and uplink and downlink radio frequency links doe not match, $\hat{H}_{q,i}(k)$ may be different from real downlink channel information $H_{q,i}(k)$ by a constant, i.e., $\hat{H}_{q,i}(k) = \alpha H_{qi}(k)$. In this embodiment, $\hat{H}_{q,i}(k)$ can alternatively be a channel matrix derived by the base station from a feedback by the user equipment, and at this time, the user equipment needs not to transmit an SRS signal.

Figure 7:
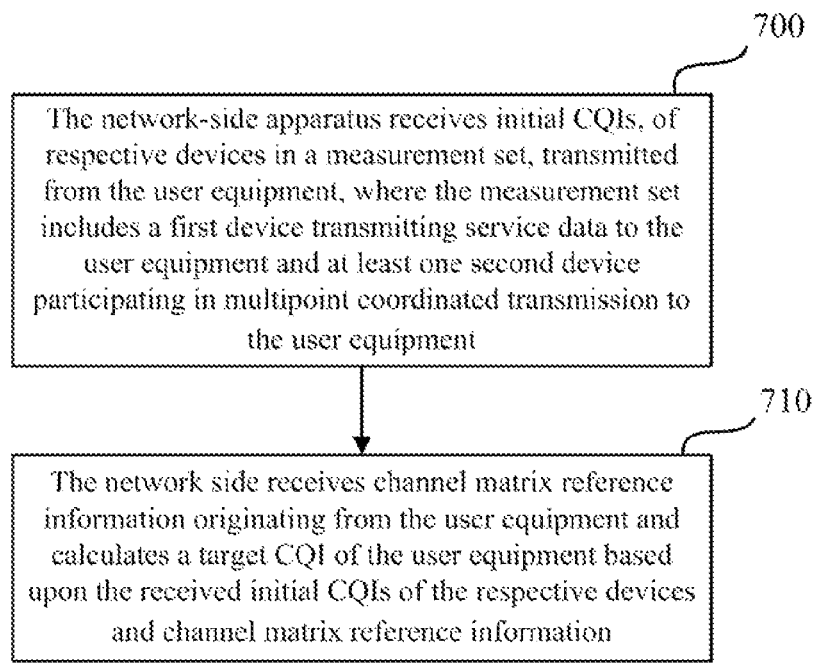
FIG. 7 is a flow chart of a network-side apparatus processing a CQI reported from a user equipment in an embodiment of the invention

Based upon the foregoing embodiment, referring to FIG. 7, in an embodiment of the invention, a network-side apparatus processes a CQI reported from a user equipment in the following detailed flow:

Step 700: The network-side apparatus receives initial CQIs, of respective devices in a measurement set, transmitted from the user equipment, where the measurement set includes a serving device of the user equipment and a coordinating device participating in multipoint coordinated transmission to the user equipment.

Alike the network-side apparatus can be the first device in the measurement set or can be any one or more devices in the measurement set or can be a central control node connected with all the devices in the measurement set. If it is more than one base station, then the respective base stations operate under the same principle.

Step 710: The network side receives channel matrix reference information originating from the user equipment and calculates a target CQI of the user equipment based upon the received initial CQIs of the respective devices and channel matrix reference information.

In this embodiment, in the process of the step 710, the network-side apparatus can also receive channel matrix reference information originating from the user equipment in (including but not limited to) the following two approaches:

In a first approach, each device in the measurement set derives a corresponding uplink channel matrix respectively based upon an SRS received from the user equipment and derives a corresponding downlink channel matrix respectively based upon channel reciprocity, and the network-side apparatus receives the downlink channel matrix transmitted from each device respectively and takes the respective downlink channel matrices as the channel matrix reference information.

In a second approach, the network-side apparatus receives channel matrices, transmitted from the user equipment, derived respectively based upon a downlink reference symbol of each device in the measurement set and takes the respective channel matrices as the channel matrix reference information.

In this embodiment, the network-side apparatus calculates a target CQI of the user equipment based upon the received initial CQIs of the respective devices and channel matrix reference information particularly as follows: after scheduling is performed by the respective devices in the measurement set (scheduling here can be CoMP-based scheduling or single-device scheduling), the network-side apparatus firstly calculates target CQIs of the user equipment on respective sub-carriers and then maps the derived target CQIs on the respective sub-carriers to a unified value, where:

The target CQI of the user equipment on any sub-carrier can be calculated in Formula 2 particularly as follows:

Where:

$\hat{\gamma}_q(k)$ is the target CQI of the user equipment q on a sub-carrier k;

$\bar{\gamma}_{qi}$ is the initial CQI of the i-th device in the measurement set of the user equipment q;

$\overline{H}_{q,i}(k)$ is a normalized channel matrix derived based upon $\hat{H}_{q,i}(k)$, $\hat{H}_{q,i}(k)=\alpha H_{qi}(k)$, and $H_{qi}(k)$ is a channel matrix of the i-th device to the user equipment q on the sub-carrier k, $\overline{H}_{q,i}(k)$ can be derived based upon $\hat{H}_{q,i}(k)$ variously, for example, $$\overline{H}_{qi}(k) = \frac{\hat{H}_{qi}(k)}{\|\hat{H}_{qi}(k)\|},$$

and in another example. $\overline{H}_{q,i}(k)$ is derived by normalizing the average of $\|\hat{H}_{q,i}(k)\|$ over a segment of bandwidth, and a repeated description thereof will be omitted here;

$U_i$ is a set of user equipments finally scheduled by the i-th device in the measurement set;

$w_q$ is a pre-coding weight of the user equipment q;

$N_{R,q}$ is the number of receiving antennas of the user equipment q;

A is the measurement set;

$\bar{\gamma}_{qp}$ is the initial CQI of the p-th device in the measurement set of the user equipment q, where $p \neq i$;

$\overline{H}_{qp}(k)$ is a normalized channel matrix derived based upon $\hat{H}_{qp}(k)$, $\hat{H}_{qp}(k)=\alpha H_{qp}(k)$, and $H_{qp}(k)$ is a channel matrix of the p-th device to the user equipment q on the sub-carrier k, where $p \neq i$;

$U_p$ is a set of user equipments finally scheduled by the p-th device in the measurement set, where $p \neq i$; and $w_l$ is a pre-coding weight of a user equipment l.

Alternatively if the complexity of calculation is allowed, then the target CQI of the user equipment on any sub-carrier can be calculated in Formula 3:

If the complexity of calculation is allowed, then the network-side apparatus can calculate a CQI output from a detector with the following assumed input-output model:

$$y = \sqrt{\bar{\gamma}_{qi}} \frac{H_{qi}(k)}{\|H_{qi}(k)\|} w_q s_q + \sum_{l \in U_i, l \neq q} \sqrt{\bar{\gamma}_{qi}} \frac{H_{qi}(k)}{\|H_{qi}(k)\|} w_l s_l + \sum_{p \neq i} \sum_{p \in A} \sum_{m \in U_p} \sqrt{\bar{\gamma}_{qp}} \frac{H_{qp}(k)}{\|H_{qp}(k)\|} w_m s_m + z = \sqrt{\bar{\gamma}_{qi}} \overline{H}_{qi}(k) w_q s_q + \sum_{l \in U_i, l \neq q} \sqrt{\bar{\gamma}_{qi}} \overline{H}_{qi}(k) w_l s_l + \sum_{p \neq i} \sum_{p \in A} \sum_{m \in U_p} \sqrt{\bar{\gamma}_{qp}} \overline{H}_{qp}(k) w_m s_m + z,$$

Where z is interference and noise beyond the measurement set, and z is defined using a covariance matrix which is a unit matrix. If a linear detector of the user equipment q on the sub-carrier k is $g_q(k)$, then the target CQI of the user equipment q on the sub-carrier k can be represented as:

$$\hat{\gamma}_q(k) = \frac{\bar{\gamma}_{qi}\|\overline{H}_{qi}(k)w_q\|^2}{\sum_{l \in U_i, l \neq q} \bar{\gamma}_{qi}\|\overline{H}_{qi}(k)w_l\|^2 / N_{R,q} + \sum_{p \neq i} \sum_{p \in A} \sum_{l \in U_p} \bar{\gamma}_{qp}\|\overline{H}_{qp}(k)w_l\|^2 / N_{R,q} + 1}$$

Formula 2

$$\hat{\gamma}_q(k) = \frac{\overline{\gamma}_{qi}|g_q(k)\overline{H}_{qi}(k)w_q|^2}{\sum_{l \in U_i, l \neq q} \overline{\gamma}_{qi}|g_q(k)\overline{H}_{qi}(k)w_l|^2 + \sum_{p \neq i} \sum_{p \in A} \sum_{m \in U_p} \overline{\gamma}_{qp}|g_q(k)\overline{H}_{qp}(k)w_m|^2 + \|g_q(k)\|^2} \quad \text{Formula 3}$$

Where:

$\hat{\gamma}_q(k)$ is the target CQI of the user equipment q on the sub-carrier k;

$\overline{\gamma}_{qi}$ the initial CQI of the i-th device in the measurement set of the user equipment q;

$g_q(k)$ is the linear detector of the user equipment q on the sub-carrier k;

$\overline{H}_{qi}(k)$ is a normalized channel matrix derived based upon $H_{qi}(k)$, $\hat{\gamma}_{qi}(k)=\alpha H_{qi}(k)$, and $H_{qi}(k)$ is a channel matrix of the i-th device to the user equipment q on the sub-carrier k;

$U_i$ is a set of user equipments finally scheduled by the i-th device in the measurement set;

$w_q$ is a pre-coding weight of the user equipment q;

A is the measurement set;

$\overline{\gamma}_{qp}$ is the initial CQI of the p-th device in the measurement set of the user equipment q, where p≠i;

$\overline{H}_{qp}(k)$ is a normalized channel matrix derived based upon $\hat{H}_{qp}(k)$ $\hat{H}_{qp}(k)=\alpha H_{qp}(k)$, and $H_{qp}(k)$ is a channel matrix of the p-th device to the user equipment q on the sub-carrier k, where p≠i;

$U_i$ is a set of user equipments finally scheduled by the p-th device in the measurement set, where p*i;

$w_l$ is a pre-coding weight of a user equipment l; and $w_m$ is a pre-coding weight of a user equipment m.

After the target CQIs of the user equipment on the respective sub-carriers are derived in any of the foregoing approaches, the derived target CQIs on the respective sub-carriers are mapped to the unified value in Formula 4 particularly as follows:

$$\gamma_q = f(\{\hat{\gamma}_q(k)\}_{k \in S}) \quad \text{Formula 4}$$

Where:

$\gamma_q$ is the unified value to which the derived target CQIs on the respective sub-carriers are mapped;

$\hat{\gamma}_q(k)$ is the target CQI of the user equipment q on the sub-carrier k;

$f(\bullet)$ is a mapping function which, for example, can be an EESM or another mapping function; and S is a set of sub-carriers, where S includes sub-carriers in a segment of bandwidth, which can be a PRB, a sub-band (including several consecutive PRBs) or the entire bandwidth of a system.

Thus the network-side apparatus maps $\hat{\gamma}_q(k)$ of the respective sub-carriers to a single CQI value, and here the base station can determine for the user equipment an MCS and a frequency-domain resource for downlink transmission of data based upon the derived single CQI value.

In the foregoing embodiments, scheduling by the respective devices in the measurement set can be coordinated scheduling or separate single-device scheduling, and for these scenarios, particularly the latter, the use of the technical solution according to the embodiments of the invention can improve their or its accuracy of CQI calculation and MCS selection to thereby improve the performance of the entire system.

In summary, in the embodiments of the invention, the user equipment feeds the initial CQIs of the respective devices in the measurement set back to the base station in the network-side apparatus according to the measurement reference signals transmitted from the respective devices in the measurement set, and the network-side apparatus calculates the target CQI of the user equipment according to the initial CQIs of the respective devices fed back from the user equipment and the channel matrix reference information fed back from the user equipment, thereby addressing the problem of feeding back a CQI for multipoint coordinated transmission in the TDD system so that the network-side apparatus can derive the target CQI finally used for downlink transmission of data based upon the initial CQIs of the multiple devices fed back from the user equipment, and thus the network side can have accurate knowledge of interference to which the user equipment is subjected and further correctly perform user equipment scheduling, resource allocation and MCS selection to thereby effectively improve the throughout of the system in multipoint coordinated transmission and improve the performance of the system. The present embodiments will be equally applicable to the FDD system, and a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of reporting a Channel Quality Indicator, CQI, comprising:
   a user equipment determining a measurement set used by the user equipment, the measurement set comprising a first device transmitting service data to the user equipment and at least one second device participating in multipoint coordinated transmission to the user equipment;
   the user equipment receiving a measurement reference signal transmitted from each device in the measurement set respectively and measuring an initial CQI of each device respectively based upon the measurement reference signal transmitted from the corresponding device; and
   the user equipment transmitting the derived initial CQIs of the respective devices to a network-side apparatus and transmitting channel matrix reference information to the network-side apparatus so that the network-side apparatus calculates a target CQI of the user equipment based upon the received initial CQIs of the respective devices and channel matrix reference information;
   wherein the user equipment measuring the initial CQI of any device based upon the measurement reference signal transmitted from the device comprises:
   the user equipment deriving channel matrices of the any device to the user equipment on respective sub-carriers based upon the measurement reference signal transmitted from the any device; and
   the user equipment calculating the initial CQI of the any device based upon the channel matrices of the any device to the user equipment on the respective sub-carriers in a formula of $\bar{\gamma}_{qi}=Q\ (f(\ \{\gamma_{qi}(k)\}_{k\in S}))$, wherein:
   $\bar{\gamma}_q$, is an initial CQI of the i-th device in the measurement set of the user equipment q;
   $Q(\bullet)$ is a quantization function;
   S is a set of sub-carriers;
   $f(\bullet)$ is a mapping function to map $\{\gamma_{qi}(k)\}_{k\in S}$ to a value representing an average channel quality on all the sub-carriers in S; and
   $\gamma_{qi}(k)$ is an initial CQI of the i-th device in the measurement set of the user equipment q on a sub-carrier k.

2. The method according to claim 1, wherein:

$$\gamma_{qi}(k) = \frac{\|H_{qi}(k)\|^2}{N(k)}, \text{ or } \gamma_{qi}(k) = \frac{\|g_q(k)H_{qi}(k)\|^2}{N(k)}, H_{qi}(k)$$

is a channel matrix, with dimensionality of $N_{R,q}\times N_{T,i}$, of the i-th device to the user equipment q on the sub-carrier k, $N_{R,q}$ is the number of receiving antennas of the user equipment q, $N_{T,i}$ is the number of transmitting antennas of a base station in the i-th device, and N(k) is interference and noise power to which the user equipment is subjected, the interference here comprising interference to the user equipment from devices beyond the measurement set, and $g_q(k)$ is a linear detector on the sub-carrier k.

3. The method according to claim 2, wherein the user equipment transmitting the derived initial CQIs of the respective devices to the network-side apparatus comprises:
   the user equipment transmitting the derived initial CQIs of the respective devices to the first device or to any one or more devices in the measurement set or to a central control node connected with all devices in the measurement set.

4. The method according to claim 2, wherein the user equipment transmitting channel matrix reference information to the network-side apparatus comprises:
   the user equipment transmitting an uplink Sounding Reference Signal, SRS, so that each device in the measurement set derives a corresponding uplink channel matrix respectively based upon the received SRS and derives a corresponding downlink channel matrix respectively based upon channel reciprocity and then transmits its own derived downlink channel matrix to the network-side apparatus as the channel matrix reference information; or
   the user equipment transmitting channel matrices, derived respectively based upon downlink reference symbols of respective devices in the measurement set, to the network-side apparatus as the channel matrix reference information.

5. A method of processing a Channel Quality Indicator, CQI, comprising:
   a network-side apparatus receiving initial CQIs, of respective devices in a measurement set, transmitted from a user equipment, the measurement set comprising a first device transmitting service data to the user equipment and at least one second device participating in multipoint coordinated transmission to the user equipment; and
   the network-side apparatus receiving channel matrix reference information originating from the user equipment and calculating a target CQI of the user equipment based upon the received initial CQIs of the respective devices and channel matrix reference information;
   wherein initial CQI of any device among the respective devices is measured by the user equipment based upon a measurement reference signal transmitted from the any device through:
   deriving channel matrices of the any device to the user equipment on respective sub-carriers based upon the measurement reference signal transmitted from the any device; and
   calculating the initial CQI of the any device based upon the channel matrices of the any device to the user equipment on the respective sub-carriers in a formula of $\bar{\gamma}=Q(f(\{\gamma_{qi}(k)\}_{k\in S})$, wherein:
   $\bar{\gamma}_q$, is an initial CQI of the i-th device in the measurement set of the user equipment q;
   $Q(\bullet)$ is a quantization function;
   S is a set of sub-carriers;
   $f(\bullet)$ is a mapping function to map $\{\gamma_{qi}(k)\}_{k\in S}$ to a value representing an average channel quality on all the sub-carriers in S; and
   $\gamma_{qi}(k)$ is an initial CQI of the i-th device in the measurement set of the user equipment q on a sub-carrier k.

6. The method according to claim 5, wherein the network-side apparatus receiving channel matrix reference information originating from the user equipment comprises:

each device in the measurement set deriving a corresponding uplink channel matrix respectively based upon an SRS received from the user equipment and deriving a corresponding downlink channel matrix respectively based upon channel reciprocity, and the network-side apparatus receiving the downlink channel matrix transmitted from the each device respectively and taking the respective downlink channel matrices as the channel matrix reference information; or the network-side apparatus receiving a channel matrix, transmitted from the user equipment, derived respectively based upon a downlink reference symbol of each device in the measurement set and taking the respective channel matrices as the channel matrix reference information.

7. The method according to claim 5, wherein the network-side apparatus calculating a target CQI of the user equipment based upon the received initial CQIs of the respective devices and channel matrix reference information comprises:

after scheduling is performed by the respective devices in the measurement set, the network-side apparatus calculating target CQIs of the user equipment on respective sub-carriers; and the network-side apparatus mapping the derived target CQIs on the respective sub-carriers to a unified value.

8. The method according to claim 7, wherein the network-side apparatus calculates the target CQI of the user equipment on any sub-carrier in a formula of $$\hat{\gamma}_q(k) = \frac{\bar{\gamma}_{qi}\|\overline{H}_{qi}(k)w_q\|^2}{\sum_{l \in U_i, l \neq q} \bar{\gamma}_{qi}\|\overline{H}_{qi}(k)w_l\|^2/N_{R,q} + \sum_{p \neq i} \sum_{p \in A} \sum_{l \in U_p} \bar{\gamma}_{qp}\|\overline{H}_{qp}(k)w_l\|^2/N_{R,q} + 1},$$

wherein:

$\hat{\gamma}_q(k)$ is a target CQI of the user equipment q on a sub-carrier k;

$\bar{\gamma}_{qi}$, is an initial CQI of the i-th device in the measurement set of the user equipment q;

$\overline{H}_{qi}(k)$ is a normalized channel matrix derived based upon $\hat{H}_{qi}(k)$, $\hat{H}_{qi}(k) = \alpha H_{qi}(k)$, and $H_{qi}(k)$ is a channel matrix of the i-th device to the user equipment q on the sub-carrier k;

$U_i$ is a set of user equipments finally scheduled by the i-th device in the measurement set;

$w_q$ is a pre-coding weight of the user equipment q;

$N_{R,q}$ is the number of receiving antennas of the user equipment q;

A is the measurement set;

$\bar{\gamma}_{qp}$ is an initial CQI of the p-th device in the measurement set of the user equipment q, wherein p≠i;

$\overline{H}_{qp}(k)$ is a normalized channel matrix derived based upon $\hat{H}_{qp}(k)$, $\hat{H}_{qp}(k) = \alpha H_{qp}(k)$, and $H_{qp}(k)$ is a channel matrix of the p-th device to the user equipment q on the sub-carrier k, wherein p≠i;

$U_p$ is a set of user equipments finally scheduled by the p-th device in the measurement set, wherein p≠i; and $w_l$ is a pre-coding weight of a user equipment l.

9. The method according to claim 7, wherein the network-side apparatus calculates the target CQI of the user equipment on any sub-carrier in a formula of $$\hat{\gamma}_q(k) = \frac{\bar{\gamma}_{qi}|g_q(k)\overline{H}_{qi}(k)w_q|^2}{\sum_{l \in U_i, l \neq q} \bar{\gamma}_{qi}|g_q(k)\overline{H}_{qi}(k)w_l|^2 + \sum_{p \neq i} \sum_{p \in A} \sum_{m \in U_p} \bar{\gamma}_{qp}|g_q(k)\overline{H}_{qp}(k)w_m|^2 + \|g_q(k)\|^2},$$

wherein:

$\hat{\gamma}_q(k)$ is a target CQI of the user equipment q on a sub-carrier k;

$\bar{\gamma}_{qi}$ is an initial CQI of the i-th device in the measurement set of the user equipment q;

$g_q(k)$ is a linear detector of the user equipment q on the sub-carrier k;

$\overline{H}_{qi}(k)$ is a normalized channel matrix derived based upon $\hat{H}_{qi}(k)$, $\hat{H}_{qi}(k) = \alpha H_{qi}(k)$, and $H_{qi}(k)$ is a channel matrix of the i-th device to the user equipment q on the sub-carrier k;

$U_i$, is a set of user equipments finally scheduled by the i-th device in the measurement set;

$w_q$ is a pre-coding weight of the user equipment q;

A is the measurement set;

$\bar{\gamma}_{qp}$, is an initial CQI of the p-th device in the measurement set of the user equipment q, wherein p≠i;

$\overline{H}_{qp}(k)$ is a normalized channel matrix derived based upon $\hat{H}_{qp}(k)$, $\hat{H}_{qp}(k) = \alpha H_{qp}(k)$, and $H_{qp}(k)$ is a channel matrix of the p-th device to the user equipment q on the sub-carrier k, wherein p≠i;

$U_p$ is a set of user equipments finally scheduled by the p-th device in the measurement set, wherein p≠i;

$w_l$ is a pre-coding weight of a user equipment l; and $w_m$ in is a pre-coding weight of a user equipment m.

10. The method according to claim 7, wherein the network-side apparatus maps the derived target CQIs on the respective sub-carriers to the unified value in a formula of $\gamma_q = f(\{\hat{\gamma}_q(k)\}_{k \in S})$, wherein $\gamma_q$ is the unified value to which the derived target CQIs on the respective sub-carriers are mapped; $\hat{\gamma}_q(k)$ is a target CQI of the user equipment q on a sub-carrier k; f(·) is a mapping function; and S is a set of sub-carriers.

11. An apparatus for reporting a Channel Quality Indicator, CQI, comprising:
- a determining unit configured to determine a measurement set used by the apparatus, the measurement set comprising a first device transmitting service data to the apparatus and at least one second device participating in multipoint coordinated transmission to the apparatus;
- a receiving unit configured to receive a measurement reference signal transmitted from each device in the measurement set respectively;
- a measuring unit configured to measure an initial CQI of each device respectively based upon the measurement reference signal transmitted from the corresponding device; and
- a transmitting unit configured to transmit the derived initial CQIs of the respective devices to a network-side apparatus and to transmit channel matrix reference information to the network-side apparatus so that the network-side apparatus calculates a target CQI of the apparatus based upon the received initial CQIs of the respective devices and channel matrix reference information;
- wherein the measuring unit measuring the initial CQI of any device based upon the measurement reference signal transmitted from the device comprises:
- the measuring unit deriving channel matrices of the any device to the apparatus on respective sub-carriers based upon the measurement reference signal transmitted from the any device; and
- the measuring unit calculating the initial CQI of the any device based upon the channel matrices of the any device to the apparatus on the respective sub-carriers in a formula of $\bar{\gamma}=Q(f(\{\gamma_{qi}(k)\}_{k \in S}))$ wherein:
- $\bar{\gamma}_{qi}$ is an initial CQI of the i-th device in the measurement set of the reporting apparatus q;
- $Q(\bullet)$ is a quantization function;
- S is a set of sub-carriers;
- $f(\bullet)$ is a mapping function to map $\{\gamma_{qi}(k)\}_{k \in S}$ to a value representing an average channel quality on all the sub-carriers in S; and
- $\gamma_{qi}(k)$ is an initial CQI of the i-th device in the measurement set of the reporting apparatus q on a sub-carrier k.

12. The apparatus according to claim 11, wherein the $$\gamma_{qi}(k) = \frac{\|H_{qi}(k)\|^2}{N(k)}, \text{ or } \gamma_{qi}(k) = \frac{\|g_q(k)H_{qi}(k)\|^2}{N(k)}, H_{qi}(k)$$

is a channel matrix, with dimensionality of $N_{R,q} \times N_{T,i}$, of the i-th device to the reporting apparatus q on the sub-carrier k, $N_{R,q}$ is the number of receiving antennas of the reporting apparatus q, $N_{T,i}$ is the number of transmitting antennas of a base station in the i-th device, and N(k) is interference and noise power to which the reporting apparatus is subjected, and $g_q(k)$ is a linear detector on the sub-carrier k.

13. The apparatus according to claim 12, wherein the transmitting unit transmitting channel matrix reference information to the network-side apparatus comprises:

- the transmitting unit transmitting an uplink Sounding Reference Signal, SRS, so that each device in the measurement set derives a corresponding uplink channel matrix respectively based upon the received SRS and derives a corresponding downlink channel matrix respectively based upon channel reciprocity and then transmits its own derived downlink channel matrix to the network-side apparatus as the channel matrix reference information; or
- the transmitting unit transmitting a channel matrix, derived respectively based upon a downlink reference symbol of each device in the measurement set, to the network-side apparatus as the channel matrix reference information.

14. An apparatus for processing a Channel Quality Indicator, CQI, comprising:
- a communicating unit configured to receive initial CQIs, of respective devices in a measurement set, transmitted from a user equipment and to receive channel matrix reference information originating from the user equipment, the measurement set comprising a first device transmitting service data to the user equipment and at least one second device participating in multipoint coordinated transmission to the user equipment; and
- a processing unit configured to calculate a target CQI of the user equipment based upon the received initial CQIs of the respective devices and channel matrix reference information;
- wherein initial CQI of any device among the respective devices received by the communicating unit is measured by the user equipment based upon a measurement reference signal transmitted from the any device through:
- deriving channel matrices of the any device to the user equipment on respective sub-carriers based upon the measurement reference signal transmitted from the any device; and
- calculating the initial CQI of the any device based upon the channel matrices of the any device to the user equipment on the respective sub-carriers in a formula of $\bar{\gamma}_{qi} = Q(f(\{\gamma_{qi}(k)\}_{k \in S}))$, wherein:
- $\bar{\gamma}_{qi}$ is an initial CQI of the i-th device in the measurement set of the user equipment q;
- $Q(\bullet)$ is a quantization function;
- S is a set of sub-carriers;
- $f(\bullet)$ is a mapping function to map $\{\gamma_{qi}(k)\}_{k \in S}$ to a value representing an average channel quality on all the sub-carriers in S; and
- $\gamma_{qi}(k)$ is an initial CQI of the i-th device in the measurement set of the user equipment q on a sub-carrier k.

15. The apparatus according to claim 14, wherein the apparatus is the first device transmitting service data to the user equipment or any one or more devices in the measurement set or a central control node connected with all devices in the measurement set.

16. The apparatus according to claim 14, wherein the communicating unit receiving channel matrix reference information originating from the user equipment comprises:

each device in the measurement set deriving a corresponding uplink channel matrix respectively based upon an SRS received from the user equipment and deriving a corresponding downlink channel matrix respectively based upon channel reciprocity, and the communicating unit receiving the downlink channel matrix transmitted from the each device respectively and taking the respective downlink channel matrices as the channel matrix reference information; or the communicating unit receiving a channel matrix, transmitted from the user equipment, derived respectively based upon a downlink reference symbol of each device in the measurement set and taking the respective channel matrices as the channel matrix reference information.

17. The apparatus according to claim 14, wherein the processing unit calculating a target CQI of the user equipment based upon the received initial CQIs of the respective devices and channel matrix reference information comprises:

after scheduling is performed by the respective devices in the measurement set, the processing unit calculating target CQIs of the user equipment on respective sub-carriers; and the processing unit mapping the derived target CQIs on the respective sub-carriers to a unified value.

18. The apparatus according to claim 17, wherein the processing unit calculates the target CQI of the user equipment on any sub-carrier in a formula of $$\hat{\gamma}_q(k) = \frac{\overline{\gamma}_{qi}\|\overline{H}_{qi}(k)w_q\|^2}{\displaystyle\sum_{l\in U_i, l\neq q} \overline{\gamma}_{qi}\|\overline{H}_{qi}(k)w_l\|^2 / N_{R,q} + \sum_{p\neq i}\sum_{p\in A}\sum_{l\in U_p} \overline{\gamma}_{qp}\|\overline{H}_{qp}(k)w_l\|^2 / N_{R,q} + 1},$$

wherein:

$\hat{\gamma}_q(k)$ is a target CQI of the user equipment q on a sub-carrier k;

$\overline{\gamma}_{qi}$ is an initial CQI of the i-th device in the measurement set of the user equipment q;

$\overline{\gamma}H_{qi}(k)$ is a normalized channel matrix derived based upon $\hat{H}_{qi}(k)$, $\hat{H}_{qi}(k)=\alpha H_{qi}(k)$, and $H_{qi}(k)$ is a channel matrix of the i-th device to the user equipment q on the sub-carrier k;

$U_i$, is a set of user equipments finally scheduled by the i-th device in the measurement set;

$w_q$ is a pre-coding weight of the user equipment q;

$N_{R,q}$ is the number of receiving antennas of the user equipment q;

A is the measurement set;

$\overline{\gamma}_{qp}$, is an initial CQI of the p-th device in the measurement set of the user equipment q, wherein p≠i;

$\overline{H}_{qp}(k)$ is a normalized channel matrix derived based upon $\hat{H}_{qp}(k)$, $\hat{H}_{qp(k)=\alpha H_{qp}}(k)$, and $H_{qp}(k)$ is a channel matrix of the p-th device to the user equipment q on the sub-carrier k, wherein p≠i;

$U_p$ is a set of user equipments finally scheduled by the p-th device in the measurement set, wherein p≠i; and $w_l$ is a pre-coding weight of a user equipment 1.

19. The apparatus according to claim 17, wherein the processing unit calculates the target CQI of the user equipment on any sub-carrier in a formula of $$\hat{\gamma}_q(k) = \frac{\overline{\gamma}_{qi}|g_q(k)\overline{H}_{qi}(k)w_q|^2}{\displaystyle\sum_{l\in U_i, l\neq q} \overline{\gamma}_{qi}|g_q(k)\overline{H}_{qi}(k)w_l|^2 + \sum_{p\neq i}\sum_{p\in A}\sum_{m\in U_p} \overline{\gamma}_{qp}|g_q(k)\overline{H}_{qp}(k)w_m|^2 + \|g_q(k)\|^2},$$

wherein:

$\hat{\gamma}_q(k)$ is a target CQI of the user equipment q on a sub-carrier k;

$\overline{\gamma}_{qi}$ is an initial CQI of the i-th device in the measurement set of the user equipment q;

$g_q(k)$ is a linear detector of the user equipment q on the sub-carrier k;

$\overline{H}_{qi}(k)$ is a normalized channel matrix derived based upon $\hat{H}_{qi}(k)$, $\hat{H}_{qi}(k)=\alpha H_{qi}(k)$, and $H_{qi}(k)$ is a channel matrix of the i-th device to the user equipment q on the sub-carrier k;

$U_i$, is a set of user equipments finally scheduled by the i-th device in the measurement set;

$w_q$ is a pre-coding weight of the user equipment q;

A is the measurement set;

$\overline{\gamma}_{qp}$ is an initial CQI of the p-th device in the measurement set of the user equipment q, wherein p≠i;

$\overline{H}_{qp}(k)$ is a normalized channel matrix derived based upon $\hat{H}(k)$, $\hat{H}_{qp}(k)=\alpha H_{qp}(k)$, and $H_{qp}(k)$ is a channel matrix of the p-th device to the user equipment q on the sub-carrier k, wherein p≠i;

$U_p$ is a set of user equipments finally scheduled by the p-th device in the measurement set, wherein p≠i;

$w_l$ is a pre-coding weight of a user equipment 1; and $w_m$ is a pre-coding weight of a user equipment m.

20. The apparatus according to claim 17, wherein the processing unit maps the derived target CQIs on the respective sub-carriers to the unified value in a formula of $\gamma_q=f(\{\hat{\gamma}_q(k)\}_{k\in S})$, wherein $\gamma_q$ is the unified value to which the derived target CQIs on the respective sub-carriers are mapped; $\hat{\gamma}_q(k)$ is a target CQI of the user equipment q on a sub-carrier k; $f(\cdot)$ is a mapping function; and S is a set of sub-carriers.

* * * * *